United States Patent [19]

Burke et al.

[11] 4,303,006
[45] Dec. 1, 1981

[54] ROLLING DIAPHRAGM APPARATUS

[75] Inventors: John P. Burke, Leamington Spa; Alastair J. Young, Kenilworth, both of England

[73] Assignee: Automotive Products Limited, Warwickshire, England

[21] Appl. No.: 103,420

[22] Filed: Dec. 13, 1979

[30] Foreign Application Priority Data

Dec. 21, 1978 [GB] United Kingdom ............... 4963/78

[51] Int. Cl.³ ........................................... F01B 11/02
[52] U.S. Cl. ................................... 92/85 R; 92/98 D
[58] Field of Search ............... 92/85 R, 98 D, 99, 102

[56] References Cited

U.S. PATENT DOCUMENTS

| | | | |
|---|---|---|---|
| 3,053,235 | 9/1962 | Hager | 92/85 R |
| 3,076,441 | 2/1963 | Ayers, Jr. | 92/99 |
| 3,183,789 | 5/1965 | Stelzer | 92/99 |
| 3,352,209 | 11/1967 | Cripe | 92/99 |
| 3,577,832 | 5/1971 | Parsons | 92/98 D |
| 3,593,956 | 7/1971 | McCarty, Jr. | 92/98 D |
| 3,656,413 | 4/1972 | Eggstein | 92/99 |
| 4,043,251 | 8/1977 | Ohmi | 92/99 |

Primary Examiner—Abraham Hershkovitz
Attorney, Agent, or Firm—Kemon & Estabrook

[57] ABSTRACT

This invention relates to a rolling diaphragm apparatus in which an annular diaphragm is secured by its outer and inner peripheries respectively to a housing and a piston between which the diaphragm seals against fluid leakage. One of said peripheries is formed as a bead which locates in an annular seat on the part to which said one periphery is attached, the bead being retained on its seat by a resilient retaining ring that snaps into position on the seat part. The bead has a substantially radially directed face and a substantially axially directed face, both of said faces engaging with corresponding faces on the retaining ring which snaps into positive engagement with the seat part.

Such a construction is particularly useful in vacuum boosters for motor vehicle braking systems.

4 Claims, 4 Drawing Figures

ROLLING DIAPHRAGM APPARATUS

This invention relates to rolling diaphragm apparatus in which an annular diaphragm is secured by its outer and inner peripheries respectively to a housing and a piston between which the diaphragm seals against fluid leakage. Such an apparatus will hereinafter be referred to as an apparatus of the kind referred.

Such rolling diaphragm apparatus are utilised in vacuum assisted brake boosters and a problem associated with such apparatus is the securing of the inner periphery of the diaphragm to the piston. One method of securing the inner periphery is for a portion of the piston to have an annular groove therein and for the inner periphery of an elastomeric diaphragm to be of a lesser diameter than the groove so that the elastomeric flexible diaphragm will snap into the groove. This is described in detail in British Patent No. 1 011 731.

However, there are problems associated with the above method of securing the inner periphery to the piston. During the production of vacuum assisted boosters the diaphragm may not go fully home into the groove and this fault may not be discovered until the booster is fully assembled. Further, during bleeding of the brakes the rapid reciprocation of the piston may cause the diaphragm to balloon out and thereby pull the inner periphery out of its groove.

The object of the present invention is to provide a booster in which the above problems are overcome.

According to this invention there is provided a booster of the kind referred and in which one of said peripheries is formed as a bead which locates in an annular seat on the part to which said one periphery is attached, the bead being retained on its seat by a resilient retaining ring that snaps into position on the seat part, wherein the bead has a substantially radially directed face and a substantially axially directed face, both of said faces engaging with corresponding faces on the retaining ring which snaps into positive engagement with the seat part.

Conveniently the retaining ring has a further portion that engages against the seat part so as to support the ring against movement caused by loads acting on the diaphragm.

Preferably the further portion of the ring is utilised as a piston back stop such that the resilient ring contacts the housing on the return movement of the piston.

Conveniently, the bead is attached to the piston and the piston comprises a central portion to which the bead is secured by said ring and an outer annular portion which supports the diaphragm, the retaining ring being utilised also for securing said outer portion to said central portion.

The invention will be described by way of example and with reference to the accompanying drawings in which.

Figure 1:
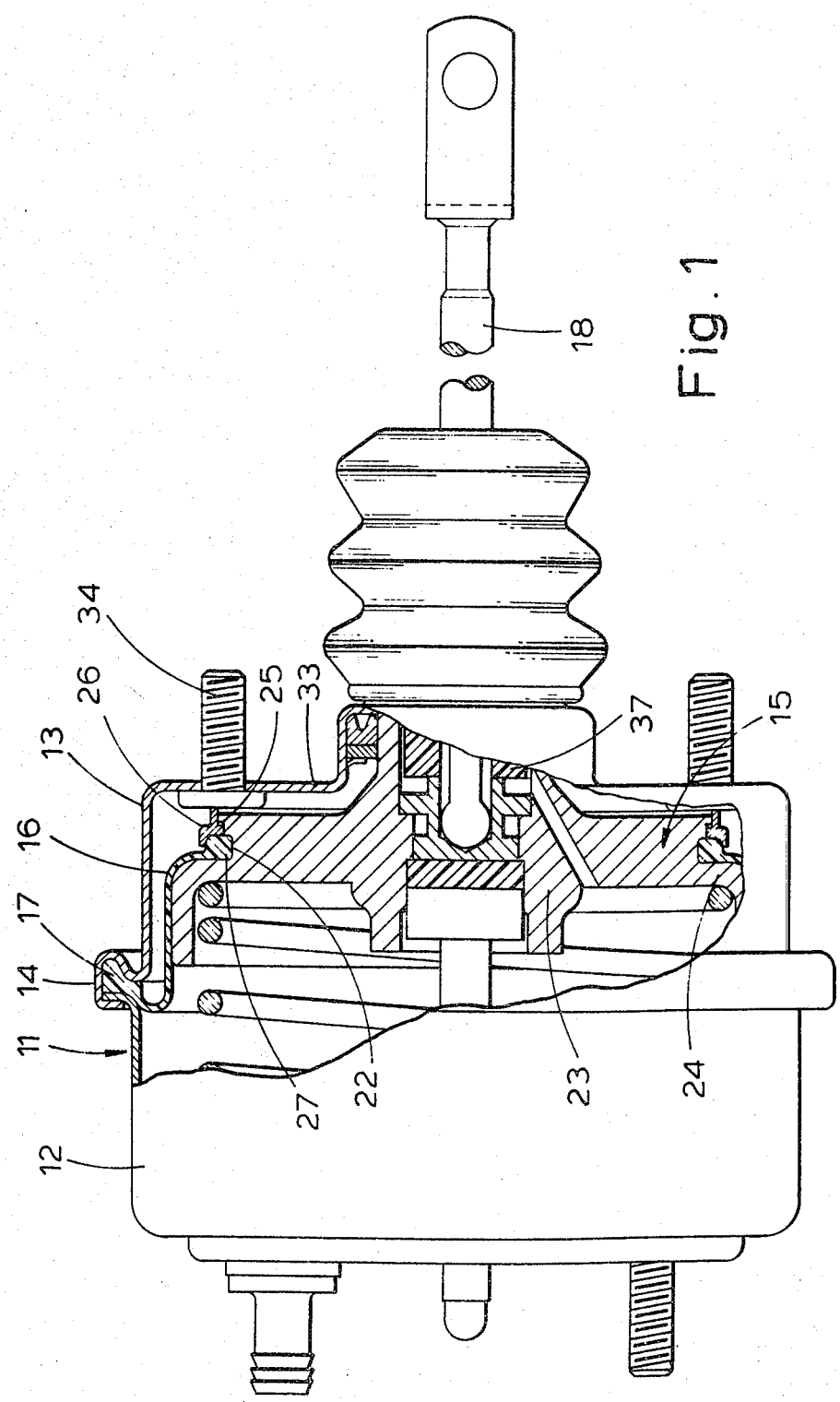
FIG. 1 is an elevation/sectional view through a booster including a rolling diaphragm apparatus according to this invention.

A vacuum assisted booster for a motor vehicle hydraulic brake system is shown in FIG. 1. The workings of such boosters are very well known and only those features of the booster that relate to the invention will be described. The booster in FIG. 1 includes a cylindrical housing 11 formed from two cup shaped casings 12 and 13 jointed together by interlocking rims 14. A piston 15 is axially movable in the housing 11 and an annular flexible diaphragm 16 is secured by its inner and outer peripheries respectively to the piston 15 and the housing 11 to seal against fluid leakage therebetween.

The outer periphery of the diaphragm has an integrally moulded bead 17 thereon which is trapped between the interlocking rims 14 of the housing and the inner periphery of the diaphragm also has an integrally moulded bead 27 thereon which is a snug fit in a seat constituted by a rectangular cross-sectional annular groove 22 in the piston 15. When the bead 27 is correctly located in the groove 22 it presents a radially directed face and an axially directed face that lies outside the groove and which will engage with corresponding faces on a retaining ring 26. The piston 15 comprises a central portion 23 housing a control valve 37 and a driver operable input rod 18, and an outer annular portion 24 which supports the diaphragm 16. The annular groove 22 is located in a shoulder between said two different portions 23 and 24 such that the inner bead 27 is only partially accommodated in the groove 22.

Figure 2:
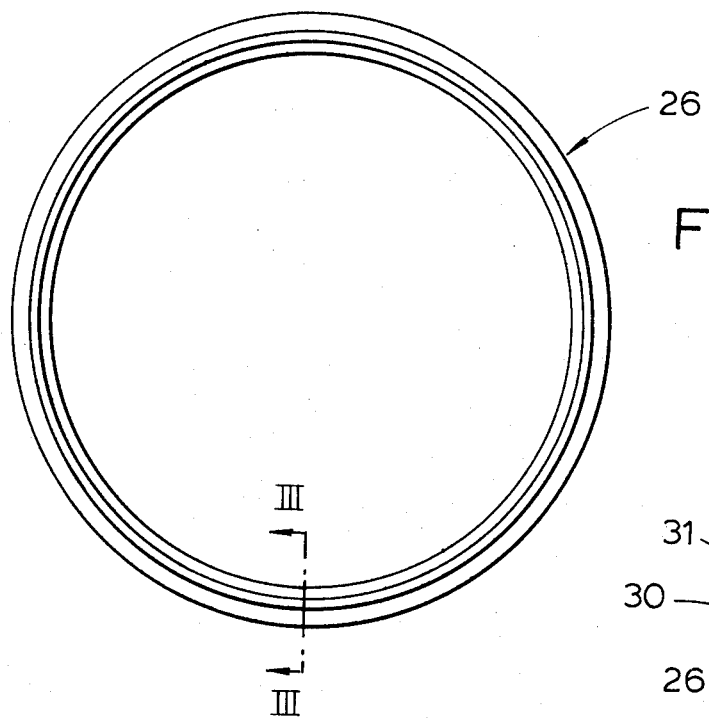
FIG. 2 is a snap-over ring as utilised in FIG. 1.

The outer peripheral surface of the central portion 23 has an annular recess 25 therein adjacent and interconnecting with the annular groove 22. The recess 25 provides an undercut for the retention of the snap-over resilient retaining ring 26 shown in detail in FIG. 2 and FIG. 3. The snap-over ring 26 is of a resilient rigid plastics material for example, polypropylene, nylon, or acetal resins, which have been moulded to shape.

Figure 3:
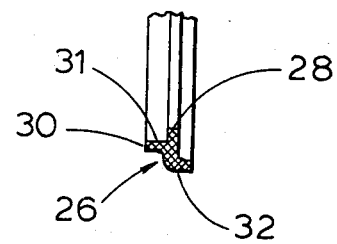
FIG. 3 is a section on the line III—III through the snap-over ring.

The ring 26 has a cross-section as shown in FIG. 3 and has an axially extending portion 30, the radially inner surface 31 of which lies against the outer surface of the central portion 23 and is thereby supported against tilting movement caused by loads acting on the diaphragm. This portion 30 shown in cross-section in FIG. 3 forms an annular axial projection. That portion of the ring 26 adjacent the bead 27 has an inwardly projecting detent 28 that snaps into the recess 25, and an outwardly projecting lipped flange 32 which when the ring 26 is snapped home, embraces the radially and axially directed faces of the bead 27. The engagement of the bead with the lipped flange 32 prevents the bead from being withdrawn radially outwards from the groove 22. Further, because of the close fit of the ring around the bead, the ring 26 can only be snapped in position when the bead 27 is properly located in its groove 22.

When the vehicle brakes are being bled during servicing, the piston 15 reciprocates rapidly in the housing and there is no partial vacuum acting in the housing 11. Thus the diaphragm 16 tends to balloon and lift away from its annular support 24. The lipped flange 32 ensures that the inner bead 27 remains in position. The annular projection 30 on the ring 26 extends axially away from the bead 27 towards the input rod 18, so as to provide a stop for the piston 15 against the end wall 33 of the casing 13. As is shown in FIG. 1 the projection abuts the heads of studs 34 utilised for securing the booster to a vehicle bulkhead. Sometimes if the brakes are rapidly released the piston 15 is returned violently towards the wall 33 and the piston 15, in some prior art boosters can strike the heads of the studs 34, causing damage to the piston. The projection 30 abuts the studs 34 and the input load is transmitted through the ring 26 to the bead 27, and since the recess 25 interconnects with the groove 22 the ring 26 is cushioned against the bead 27 which being resilient will absorb the loads shock.

Figure 4:
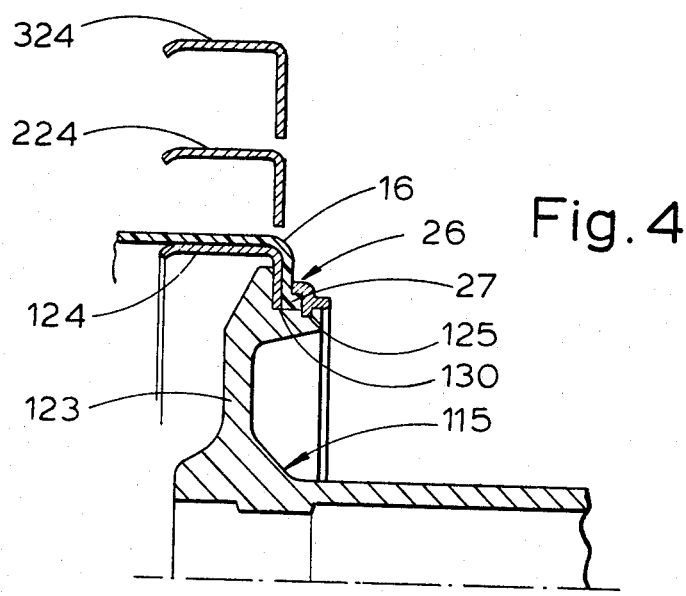
FIG. 4 is an alternative assembly of a booster piston and diaphragm of another embodiment of this invention.

An alternative piston design is shown in FIG. 4 in which the piston 115 comprises a central portion 123 moulded out of a phenolic plastics moulding compound, and an outer annular portion 124 pressed out of sheet steel.

The outer portion 125 fits onto a shoulder 130 on the central portion 123 and is then secured in position by the lock ring 26 which serves to secure both the diaphragm 16 and the steel outer portion 124 in position. It can be seen in FIG. 4 that the inner bead 27 of the diaphragm 16 is not accommodated in a groove, as in FIG. 1, but merely sits in the shoulder 130 against which the outer portion 124 abuts. The lipped flange of the ring 26 embraces the bead 27 as previously described and the detent 28 snaps into a groove 125 in the outer surface of the central portion 123.

This method of securing the central portion 123 to the outer portion 124 allows a common central portion to be used with a number of different diameter outer portions 224 and 324.

Whilst the invention has been described utilising a complete ring made out of a resilient rigid plastics material it is obvious that a split ring made from a like material or from split spring steel could be adopted for this invention.

We claim:

1. A rolling diaphragm apparatus having:
   a housing;
   a piston;
   an annular diaphragm secured by its inner and outer peripheries respectively to said piston and housing;
   a bead formed on the diaphragm at one of said inner and outer peripheries and having thereon a substantially axially directed face and a substantially radially directed face;
   an annular seat formed on the respective one of said piston and housing to which the bead is attached and into which the bead locates;
   and a resilient retaining ring having a positive snap fit engagement with the respective seat part, said snap fit being formed by a detent on one of the ring and seat part engaging a groove in the other of the ring and seat part and the ring having corresponding faces thereon that engage with said bead faces, said ring having a portion that constitutes an annular axial projection that engages the seat part into which the ring snaps to support the ring against movement caused by loads acting on said diaphragm, said portion constituting a piston back stop means that prevents the piston from contacting the housing on retraction from an operative stroke.

2. A rolling diaphragm apparatus as claimed in claim 1, wherein said bead is also a cushioning means which absorbs any impact caused by the retraction of the piston against its back stop means.

3. A rolling diaphragm apparatus as claimed in claim 2, in which said bead is located on the inner periphery of the diaphragm which is secured to the piston by the ring which has a detent that snaps into a groove in the piston, wherein the groove lies adjacent and interconnects with the seat so that the ring can move axially against the bead which cushions such movements.

4. A rolling diaphragm apparatus as claimed in claim 1 in which said bead is attached to the piston, wherein the piston comprises a central portion to which the bead is secured by said ring, and an outer annular portion which supports the diaphragm, the retaining ring being utilised also for securing the outer annular portion to the central portion.

* * * * *